United States Patent Office 3,383,379
Patented May 14, 1968

3,383,379
AZO N-PHENYLTHIOMORPHOLINE DIOXIDE DYES
David J. Wallace and Max A. Weaver, Kingsport, Tenn., assignors to Eastman Kodak Company, Rochester, N.Y., a corporation of New Jersey
No Drawing. Filed May 19, 1965, Ser. No. 457,224
9 Claims. (Cl. 260—152)

ABSTRACT OF THE DISCLOSURE

Phenyl-azo phenyl compounds containing a 4-thiomorpholino-1,1-dioxide group are useful as dyes for hydrophobic textile materials.

---

This invention relates to azo compounds particularly useful as dyes for textile fibers, yarns and fabrics.

The azo compounds have the general formula

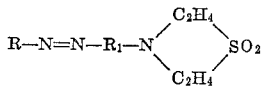

in which R, derived from diazotized aniline or substituted anilines, represents a monocyclic aromatic radical of the benzene series preferably free of sulfoalkylsulfonyl or vinylsulfonyl groups and $R_1$ represents a monocyclic aromatic radical of the benzene series, derived from aniline or a substituted aniline used in preparing the dioxide couplers described below. That is, similar azo compounds having the above formula in which

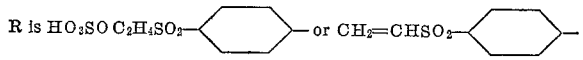

have poor properties when used as dyes for cellulose ester, polyester and polyamide textile materials for which the azo compounds of the invention are adapted. In particular, the azo compounds containing these two groups stain wool heavily and are of little or no value in dyeing polyester-wool blends and other wool blends.

Otherwise, the substituents attached to R and $R_1$ are not critical and serve primarily as auxochrome groups to control the color of the azo compound.

The mentioned aromatic radical R derived from an aniline compound, thus includes unsubstituted phenyl and substituted phenyl such as:

lower alkylphenyl, e.g., o,m,p-tolyl,
lower alkoxyphenyl, e.g., o,m,p-methoxyphenyl,
halophenyl, e.g., o,m,p-chlorophenyl,
nitrophenyl, e.g., o,m,p-nitrophenyl,
lower alkylsulfonylphenyl, e.g., o,m,p-methylsulfonylphenyl
lower alkylsulfonamidophenyl, e.g., o,m,p-methylsulfonamidophenyl,
lower di(alkylsulfonyl)phenyl, e.g., 2,5-di(methylsulfonyl)phenyl,
dicarboxylicacidimidophenyl, e.g., o,m-succinimidophenyl,
lower fluoroalkylphenyl, e.g., trifluoromethylphenyl,
lower alkanoylamidophenyl, e.g., o,m,p-acetamidophenyl,
cyanophenyl, e.g., o,m,p-cyanophenyl,
carboxamidophenyl, e.g., o,m,p-carboxamidophenyl, benzamidophenyl,
thiocyanophenyl, e.g., o,m,p-thiocyanophenyl,
lower alkylthiophenyl, e.g., o,m,p-methylthiophenyl,
benzoxyphenyl, e.g., o,m,p-benzoxyphenyl,
benzylaminophenyl, e.g., o,m,p-benzylaminophenyl,
N-alkylbenzaminophenyl, e.g., N-phenylmethylaminophenyl,
formylphenyl, e.g., o,m,p-formylphenyl,
lower carbalkoxyphenyl, e.g., o,m,p-carbethoxyphenyl, and
benzoylphenyl, e.g., o,m,p-benzoylphenyl The aromatic radical $R_1$ can be unsubstituted p-phenylene or p-phenylene substituted with lower alkyl, e.g., methyl-p-phenylene, lower alkoxy, e.g., methoxy-p-phenylene, halogen, e.g., chloro-p-phenylene, lower alkylthio, e.g., methylthio-p-phenylene, lower alkanoylamido, e.g., acetamido-p-phenylene, or lower alkylsulfonamido, e.g., methylsulfonamido-p-phenylene.

In radicals R and $R_1$ the alkyl groups are preferably lower alkyl of 1 to 4 carbon atoms.

The azo compounds of Formula I are prepared by diazotizing monocyclic aromatic amines of the benzene series $RNH_2$ preferably free of the sulfoalkylsulfonyl or vinylsulfonyl groups, and coupling with N-phenylthiomorpholine dioxide couplers of the formula II 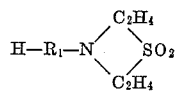

where R and $R_1$ have the meaning given above.

The dioxides II are prepared by reaction of divinyl sulfone with a wide variety of aniline derivatives, $R_1NH_2$ as described in the examples.

Representative dioxide couplers are:

N-phenylthiomorpholine dioxide
N-(m-methylphenyl i.e., meta to morpholine N-atom) thiomorpholine dioxide
N-(m-chlorophenyl)thiomorpholine dioxide
N-(m-methoxyphenyl)thiomorpholine dioxide
N-(3,6-dimethoxyphenyl)thiomorpholine dioxide
N-(3-acetamido-6-methoxyphenyl)thiomorpholine dioxide,
N-(3-methoxy-6-methylphenyl)thiomorpholine dioxide.

The azo compounds can be used for dyeing textile materials including synthetic polymer fibers, yarns and fabrics giving a variety of fast shades when applied thereto by conventional dyeing methods. The azo compounds have moderate affinity for cellulose ester and polyamide fibers. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative intermediates and azo compounds of our invention.

EXAMPLE 1

A. Preparation of the coupler—N-phenylthiomorpholine dioxide

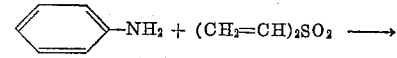

46.5 g. (0.5 m.) aniline and 59.0 g. (0.50 m.) divinyl sulfone were stirred and heated on the steam bath for three hours. The mixture was cooled and 750 cc. 6% HCl was added. Steam was blown through until the mixture boiled and solution was almost complete. The above product crystallized out on cooling. The white solid was filtered off, washed with water, and dried. M.P. 118–120° C.

B. Preparation of the dye 6.21 g. 2,6-dichloro-4-nitroaniline was dissolved in 37.5 cc. conc. $H_2SO_4$ at 25° C. The solution was chilled and a solution of 2.2 g. $NaNO_2$ in 15 cc. conc. $H_2SO_4$ was added below 5° C. The diazotization was stirred at 0–5° C. for 2 hours, then added to a chilled solution of 6.33 g. of the coupler (a) above in 250 cc. 1:5 acid (5 parts acetic acid to 1 part propionic acid) plus 250 cc. 15% aqueous $H_2SO_4$ below 15° C. The coupling was neutralized with solid ammonium acetate to brown on Congo Red paper. After coupling two hours, the mixture was drowned with water, filtered, washed with water, and dried. The product dyed polyester fibers a desirable red-yellow shade of exceptional light and sublimation-fastness, and had the formula shown in claim 5.

EXAMPLE 2

The coupler, N-(m-tolyl)thiomorpholine dioxide, was made as in Example 1, substituting an equimolar amount of m-toluidine for aniline. The product melts 90–91.5° C. To prepare the dye, a solution of 3.6 g. dry $NaNO_2$ in 25 cc. conc. $H_2SO_4$ was cooled in an ice-bath and 50 cc. 1:5 acid was added below 15° C. This solution was stirred at 5° C. and 8.6 g. 2-chloro-4-nitroaniline was added, followed by 50 cc. 1:5 acid. The diazotization was stirred two hours at 0–5° C., then added to a chilled solution of 12.3 g. of the above coupler in 250 cc. 1:5 acid. The coupling was kept cold and neutralized to Congo Red paper with solid ammonium acetate. After coupling two hours, the mixture was drowned in water, filtered, washed with water, and dried. The product dyed polyester fibers an orange shade of excellent fastness properties.

EXAMPLE 3

6.9 g. p-nitroaniline was dissolved in 5.4 cc. conc. $H_2SO_4$ and 12.6 cc. water. This solution was poured onto 50 g. ice and then a solution of 3.6 g. sodium nitrite in 8 cc. water was added all at once. The diazotization was stirred at 5° C. for one hour, resulting in almost complete solution. After filtration, the diazonium solution was added to a chilled solution of 12.3 g. of the coupler from Example 2 in 250 ml. dilute $H_2SO_4$. This mixture was held at 0–3° C. and neutralized to Congo Red paper with solid ammonium acetate. After coupling two hours at ice-bath temperature, the mixture was drowned in water, filtered, washed with water, and dried. The product dyed polyester fibers yellow shades.

EXAMPLE 3A

The process of Example 1 was carried out except using 6.61 g. N-(m-tolyl)thiomorpholine dioxide. The product dyed polyester fibers a desirable red-yellow shade of exceptional light and sublimation fastness.

EXAMPLE 3B

The process of Example 2 was carried out except using 11.85 g. N-phenylthiomorpholine dioxide. The product dyed polyester fibers an orange shade of excellent fastness properties.

EXAMPLE 3C 6.37 g. p-chloroaniline was dissolved in 100 cc. water containing 20 cc. conc. HCl. This solution was cooled internally with ice and a solution of 3.6 g. $NaNO_2$ in 25 cc. water was added over about five minutes. After 15 minutes additional standing, this diazonium was added to a chilled solution of 11.25 g. N-(m-tolyl)thiomorpholine dioxide in 250 cc. dilute HCl. The coupling mixture was neutralized with $NaHCO_3$, coupled two hours, filtered, washed with water, and dried. The product dyed polyester fibers an orange shade of excellent fastness properties.

In the manner of the above examples, other aniline derivatives of the formula $R_1NH_2$ are reacted with divinyl sulfone and the resulting dioxide coupled with anilines of formula $RNH_2$ to obtain azo dyes such as described in the following table.

| Example No. | Substituents On Radical R | Substituents On Radical $R_1$ | Color on Polyester Fiber |
| --- | --- | --- | --- |
| 4 | None | None | Yellow. |
| 5 | 4-$NO_2$ | do | Do. |
| 6 | 4-$NO_2$ | 3-Cl* | Do. |
| 7 | 4-$NO_2$ | 3-$OCH_3$ | Do. |
| 8 | 4-$NO_2$ | 3-$OCH_3$-6-$CH_3$ | Do. |
| 9 | 4-$NO_2$ | 3,6-di-$OCH_3$ | Do. |
| 10 | 2-Cl-4-$NO_2$ | None | Orange. |
| 11 | 2,4-di-Cl-6-$NO_2$ | do | Do. |
| 12 | 2,4-di-$NO_2$ | do | Do. |
| 13 | 2,4-di-$NO_2$ | 3-$CH_3$ | Do. |
| 14 | 2-$SO_2CH_3$-4-$NO_2$ | None | Do. |
| 15 | 2-$SO_2CH_3$-4-$NO_2$ | 3-$CH_3$ | Do. |
| 16 | 2,4-di-$NO_2$-6-CN | 3-$CH_3$ | Pink. |
| 17 | 2,4-di-$NO_2$-6-CN | None | Red. |
| 18 | 2,4-di-$NO_2$-6-$SO_2NHC_2H_5$ | do | Do. |
| 19 | 2,4-di-$NO_2$-6-$SO_2NHC_2H_5$ | 3-$CH_3$ | Pink. |
| 20 | 2,4-di-$NO_2$-6-$SO_2NHC_2H_5$ | 3-$NHCOCH_3$ | Violet. |
| 21 | 2,4-di-$NO_2$-6-$SO_2NHC_2H_5$ | 3-$NHCOCH_3$-6-$OCH_3$ | Do. |
| 22 | 2,4-di-$NO_2$-6-$SO_2NHC_2H_5$ | 3-$CH_2OCOCH_3$ | Pink. |
| 23 | 4-$CH_3$ | 3-$CH_3$ | Yellow. |
| 24 | 4-$OCH_3$ | 3-$CH_3$ | Do. |
| 25 | 4-$CO_2C_2H_5$ | 3-$CH_3$ | Do. |
| 26 | 4-$CONH_2$ | 3-$CH_3$ | Do. |
| 27 | 2,4-di-Br | 3-$CH_3$ | Yellow. |
| 28 | 4-$CF_3$ | 3-$CH_3$ | Orange. |
| 29 | 3-Cl | 3-$CH_3$ | Yellow. |
| 30 | 3-$CH_3$ | 3-$CH_3$ | Do. |
| 31 | 2-$OCH_3$-5-$CH_3$ | 3-$CH_3$ | Do. |

*Meta to morpholino atom.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula

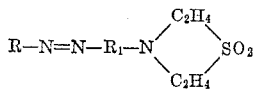

wherein

R represents a phenyl radical free of sulfoalkylsulfonyl and vinylsulfonyl groups, and $R_1$ represents p-phenylene [and] or p-phenylene substituted with lower alkyl, lower alkoxy, halogen, lower alkylsulfonamido, or lower carboxylic acrylamido.

2. A water-insoluble compound according to claim 1 wherein R represents phenyl or phenyl substituted with lower alkyl, lower alkoxy, chlorine, bromine, nitro, lower alkylsulfonyl, lower alkylsulfonamido, trifluoromethyl, lower amido, cyano, thiocyano, carboxamido, lower alkylthio, or lower carbalkoxy.

3. A water-insoluble compound according to claim 1 wherein R represents 2,6-dichloro-4-nitrophenyl, 2-chloro-4-nitrophenyl, 4-nitrophenyl, 4-chlorophenyl, or 6-cyano-2,4-dinitrophenyl.

4. A water-insoluble compound according to claim 3 wherein $R_1$ represents, with respect to the thiomorpholino nitrogen atom to which $R_1$ is attached, 1,4-phenylene, 3-methyl-1,4-phenylene, 3-chloro-1,4-phenylene, 3-methoxy-1,4-phenylene, 3-acetamido-1,4-phenylene, 2-methoxy-5-methyl-1,4-phenylene, 2,5-dimethoxy-1,4-phenylene, or 3-acetamido-5-methyl-1,4-phenylene.

5. The compound

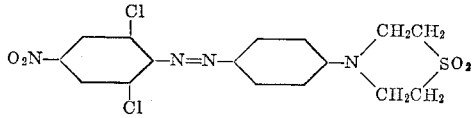

6. The compound

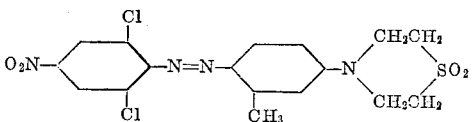

7. The compound

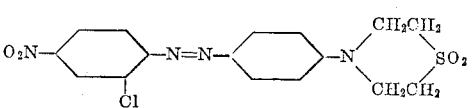

8. The compound

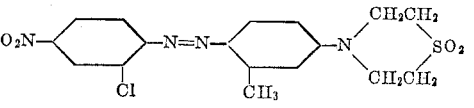

9. The compound

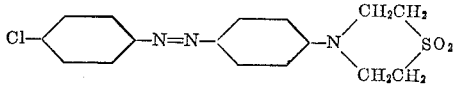

References Cited

UNITED STATES PATENTS 2,186,629   1/1940   Dickey _____ 260—152 X
2,653,150   9/1953   Mendoza _____ 260—152
3,202,657   8/1965   Kuhne et al. _____ 260—152 X

FOREIGN PATENTS 1,250,750   12/1960   France.

FLOYD D. HIGEL, *Primary Examiner.*